US009547866B2

(12) United States Patent
Terrazas et al.

(10) Patent No.: US 9,547,866 B2
(45) Date of Patent: Jan. 17, 2017

(54) METHODS AND APPARATUS TO ESTIMATE DEMOGRAPHY BASED ON AERIAL IMAGES

(71) Applicant: The Nielsen Company (US), LLC, New York, NY (US)

(72) Inventors: Alejandro Terrazas, Santa Cruz, CA (US); Michael Himmelfarb, Highland Park, IL (US); David Miller, Annandale, WA (US); Paul Donato, New York, NY (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

(21) Appl. No.: 14/733,711

(22) Filed: Jun. 8, 2015

(65) Prior Publication Data

US 2015/0269598 A1    Sep. 24, 2015

Related U.S. Application Data

(63) Continuation of application No. 13/829,625, filed on Mar. 14, 2013, now Pat. No. 9,082,014.

(51) Int. Cl.
  *G06K 9/00*  (2006.01)
  *G06Q 30/02*  (2012.01)
  *G06K 9/62*  (2006.01)
(52) U.S. Cl.
  CPC ........ *G06Q 30/0205* (2013.01); *G06K 9/0063* (2013.01); *G06K 9/00637* (2013.01); *G06K 9/6202* (2013.01)

(58) Field of Classification Search
  CPC  G06K 9/0063; G06K 9/00637; G06K 9/6202; G06Q 30/0205
  See application file for complete search history.

(56) References Cited

U.S. PATENT DOCUMENTS

| 3,240,138 A | 3/1966 | Goddard |
| 5,341,439 A | 8/1994 | Hsu |
| 5,361,201 A | 11/1994 | Jost et al. |
| 5,414,462 A | 5/1995 | Veatch |
| 5,682,525 A | 10/1997 | Bouve et al. |

(Continued)

FOREIGN PATENT DOCUMENTS

WO    2013085821    6/2013

OTHER PUBLICATIONS

Krebs et al., "Optimal Prey Selection in the Great Tit (Paras Major)", Animal Behavior, vol. 25, No. 1, Feb. 1977, (9 pages).

(Continued)

*Primary Examiner* — Nirav G Patel
(74) *Attorney, Agent, or Firm* — Hanley, Flight & Zimmerman, LLC

(57) ABSTRACT

Methods and apparatus to estimate demography based on aerial images are disclosed. An example method includes analyzing a first aerial image of a first geographic area to detect a first plurality of objects, analyzing a second aerial image of a second geographic area to detect a second plurality of objects, associating first demographic information to the second plurality of objects, the first demographic information obtained by a sampling of the second geographic area, and comparing the second plurality of objects to the first plurality of objects to estimate a demographic characteristic of the first geographic area based on the comparison.

22 Claims, 10 Drawing Sheets

(56) References Cited

U.S. PATENT DOCUMENTS

| | | |
|---|---|---|
| 5,949,988 A | 9/1999 | Feisullin et al. |
| 6,035,255 A | 3/2000 | Murphy et al. |
| 6,137,909 A | 10/2000 | Greineder et al. |
| 6,308,177 B1 | 10/2001 | Israni et al. |
| 6,385,622 B2 | 5/2002 | Bouve et al. |
| 6,535,210 B1 | 3/2003 | Ellenby et al. |
| 6,665,449 B1 | 12/2003 | He et al. |
| 6,850,946 B1 | 2/2005 | Rappaport et al. |
| 6,970,578 B1 | 11/2005 | Strand |
| 7,055,107 B1 | 5/2006 | Rappaport et al. |
| 7,069,232 B1 | 6/2006 | Fox et al. |
| 7,107,038 B2 | 9/2006 | Fitch et al. |
| 7,164,883 B2 | 1/2007 | Rappaport et al. |
| 7,324,666 B2 | 1/2008 | Zoken et al. |
| 7,342,722 B2 | 3/2008 | White |
| 7,587,276 B2 | 9/2009 | Gold et al. |
| 7,711,360 B2 | 5/2010 | Dundar et al. |
| 7,711,687 B2 | 5/2010 | Rappaport et al. |
| 7,844,417 B2 | 11/2010 | Du |
| 7,856,312 B2 | 12/2010 | Coombes et al. |
| 7,873,524 B2 | 1/2011 | Wenzlau et al. |
| 8,296,388 B2 | 10/2012 | Blagsvedt et al. |
| 8,341,010 B1 | 12/2012 | Gadberry et al. |
| 8,385,591 B1 | 2/2013 | Anguelov et al. |
| 8,429,156 B2 | 4/2013 | Buchmueller et al. |
| 8,489,445 B1 | 7/2013 | Berg et al. |
| 8,649,632 B2 | 2/2014 | Neophytou et al. |
| 8,660,383 B1 | 2/2014 | Callari et al. |
| 8,694,359 B2 | 4/2014 | Algranati |
| 8,761,435 B2 | 6/2014 | Chen |
| RE45,264 E | 12/2014 | Meadow et al. |
| 9,230,167 B2 | 1/2016 | Miller et al. |
| 2002/0029226 A1 | 3/2002 | Li et al. |
| 2002/0145620 A1 | 10/2002 | Smith et al. |
| 2003/0101063 A1 | 5/2003 | Sexton et al. |
| 2004/0005085 A1 | 1/2004 | Anderson |
| 2004/0260599 A1 | 12/2004 | Ziegele et al. |
| 2005/0203768 A1 | 9/2005 | Florance et al. |
| 2006/0069606 A1 | 3/2006 | Kaczkowski et al. |
| 2006/0100777 A1 | 5/2006 | Staton et al. |
| 2006/0178929 A1 | 8/2006 | Boardman et al. |
| 2007/0282665 A1 | 12/2007 | Buehler et al. |
| 2007/0282792 A1 | 12/2007 | Bailly et al. |
| 2008/0240513 A1 | 10/2008 | Xie et al. |
| 2008/0243906 A1 | 10/2008 | Peters |
| 2008/0281695 A1 | 11/2008 | Whitehead |
| 2008/0294372 A1 | 11/2008 | Hunt et al. |
| 2009/0115785 A1 | 5/2009 | Grandhi et al. |
| 2009/0164294 A1 | 6/2009 | Hu et al. |
| 2009/0187464 A1 | 7/2009 | Bai et al. |
| 2009/0222424 A1 | 9/2009 | Van |
| 2009/0231359 A1 | 9/2009 | Bass, II et al. |
| 2010/0079336 A1 | 4/2010 | Skibiski et al. |
| 2010/0111374 A1 | 5/2010 | Stoica |
| 2010/0121680 A1 | 5/2010 | Elam et al. |
| 2010/0189312 A1 | 7/2010 | Nielsen et al. |
| 2011/0085697 A1 | 4/2011 | Clippard et al. |
| 2012/0079061 A1 | 3/2012 | Krebs |
| 2012/0094639 A1 | 4/2012 | Carlson et al. |
| 2013/0004065 A1 | 1/2013 | Ma |
| 2013/0010299 A1 | 1/2013 | Bray et al. |
| 2013/0094700 A1 | 4/2013 | Mellor et al. |
| 2013/0124441 A1 | 5/2013 | Quaile et al. |
| 2013/0148895 A1* | 6/2013 | Miller .................. G06K 9/0063 382/195 |
| 2013/0226666 A1 | 8/2013 | Terrazas et al. |
| 2013/0226667 A1 | 8/2013 | Terrazas et al. |
| 2013/0301915 A1 | 11/2013 | Terrazas et al. |
| 2014/0019302 A1 | 1/2014 | Meadow et al. |
| 2014/0153835 A1 | 6/2014 | Pritt |
| 2014/0172560 A1 | 6/2014 | Satyavolu et al. |
| 2014/0270355 A1 | 9/2014 | Terrazas et al. |
| 2014/0279784 A1 | 9/2014 | Casalaina et al. |
| 2014/0340394 A1 | 11/2014 | Mattila |
| 2014/0340395 A1 | 11/2014 | Mattila |
| 2015/0016730 A1 | 1/2015 | Miller et al. |
| 2015/0086107 A1 | 3/2015 | Dedeoglu et al. |
| 2015/0089523 A1 | 3/2015 | Volovich et al. |
| 2015/0100907 A1 | 4/2015 | Erenrich et al. |
| 2015/0170377 A1 | 6/2015 | Thomas et al. |

OTHER PUBLICATIONS

Charnov, Eric L., "Optimal Foraging: Attack Strategy of a Mantid", The American Naturalist, vol. 110, No. 971, Jan.-Feb. 1976, (11 pages).

Charnov, Eric L., "Optimal Foraging, the Marginal Value Theorem", Theoretical Population Biology, vol. 9, No. 2, Apr. 1976, (8 pages).

Smith, Eric Alden, "Anthropological Applications of Optimal Foraging Theory: A Critical Review", Current Anthropology, vol. 24, No. 5, Dec. 1983 (28 pages).

Orun, Ahmet B., "Automated Identification of Man-Made Textural Features on Satellite Imagery by Bayesian Networks", School of Computer Science, University of Birmingham, Birmingham, United Kingdom, Feb. 2004, (6 pages).

Segal, Donald B., "Retail Trade Area Analysis: Concepts and New Approaches", Directions Magazine—All Things Location, Nov. 18, 1998, (10 pages).

Patent Cooperation Treaty, "Written Opinion", issued in connection with PCT application PCT/US2012/067414, mailed Feb. 13, 2013 (5 pages).

Patent Cooperation Treaty, "International Search Report", issued in connection with PCT application PCT/US2012/067414, mailed Feb. 13, 2013 (5 pages).

M.H.B.P.H.Madana, "Improving Land Use Survey Method using High Resolution Satellite Imagery", International Institute for Geo Information Science and Earth Observation (ITC), Mar. 2002, Enschede, The Netherlands, (124 pages).

Krishnamachari et al., "Hierarchical clustering algorithm for fast image retrieval," IS&T/SPIE Conference on Storage and Retrieval for Image and Video Databases VII. Jan. 1999, (9 pages).

Patent Cooperation Treaty, "International Preliminary Report on Patentability," issued in connection with Application No. PCT/US2012/067414, Jun. 10, 2014, 6 pages.

United States Patent and Trademark Office, "Notice of Allowance and Fee(s) Due," issued in connection with U.S. Appl. No. 13/314,989, May 30, 2014, 41 pages.

Wan et al., "A New Approach to Image Retrieval with Hierarchical Color Clustering," May 30, 1998, IEEE, 16 pages.

United States Patent and Trademark Office, "Non-Final Office Action," issued in connection with U.S. Appl. No. 13/829,625, Oct. 9, 2014, 27 pages.

Bhaduri, Budhendra, et al. "LandScan USA: a high-resolution geospatial and temporal modeling approach for population distribution and dynamics." GeoJournal 69.1-2 (2007): 103-117.

Simonneaux, Vincent, et al. "The use of high-resolution image time series for crop classification and evapotranspiration estimate over an irrigated area in central Morocco." International Journal of Remote Sensing 29.1 (2008): 95-116.

Patent Cooperation Treaty, "International Search Report and Written Opinion," issued in connection with Application No. PCT/US2014/026235, mailed Oct. 24, 2014, 9 pages.

Lo, "Modeling the Population of China Using DMSP Operational Linescan System Nighttime Data," Photogrammetric Engineering & Remote Sensing, vol. 67, No. 9, Sep. 2001, 11 pages.

United States Patent and Trademark Office, "Non-Final Office Action," issued in connection with U.S. Appl. No. 13/774,790, Jan. 5, 2015, 45 pages.

Hantula, "Guest Editorial: Evolutionary Psychology and Consumption," Psychology & Marketing, vol. 20(9), Sep. 2003, 8 pages.

Abelson et al., "Targeting Direct Cash Transfers to the Extremely Poor," Aug. 24-27, 2014, 10 pages.

United States Patent and Trademark Office, "Notice of Allowance and Fee(s) Due," issued in connection with U.S. Appl. No. 13/314,989, Feb. 20, 2015, 23 pages.

U.S. Appl. No. 14/473,646, filed Mar. 14, 2013, (79 pages).

(56) References Cited

OTHER PUBLICATIONS

United States Patent and Trademark Office, "Non-Final Office Action," issued in connection with U.S. Appl. No. 13/774,784, Apr. 9, 2015, 35 pages.
United States Patent and Trademark Office, "Notice of Allowance," issued in connection with U.S. Appl. No. 13/829,625, Mar. 4, 2015, 19 pages.
United States Patent and Trademark Office, "Supplemental Notice of Allowability," issued in connection with U.S. Appl. No. 13/829,625, Jun. 12, 2015, 9 pages.
United States Patent and Trademark Office, "Non-Final Office Action," issued in connection with U.S. Appl. No. 13/829,644, Jul. 9, 2015, 68 pages.
Levy, "Retailing Management—Chapter 8," 2008, 70 pages, McGraw-Hill/Irwin, Seventh Edition.
United States Patent and Trademark Office, "Notice of Allowance," issued in connection with U.S. Appl. No. 14/500,365, Oct. 9, 2015, 9 pages.
United States Patent and Trademark Office, "Notice of Allowance," issued in connection with U.S. Appl. No. 13/829,644, mailed on Feb. 22, 2016, 28 pages.
Yang, Xiaojun, "Satellite Monitoring of Urban Spatial Growth in the Atlanta Metropolitan Area," Jul. 2002, American Society for Photogrammetric Engineering and Remote Sensing, vol. 68, No. 7, pp. 725-734, 10 pages.

\* cited by examiner

METHODS AND APPARATUS TO ESTIMATE DEMOGRAPHY BASED ON AERIAL IMAGES

RELATED APPLICATIONS

This patent arises from a continuation of U.S. patent application Ser. No. 13/829,625, filed Mar. 14, 2013. The entirety of U.S. patent application Ser. No. 13/829,625 is incorporated herein by reference.

FIELD OF THE DISCLOSURE

This disclosure relates generally to surveying and, more particularly, to methods and apparatus to estimate demography based on aerial images.

BACKGROUND

Manufacturers of goods sometimes wish to determine where new markets are emerging and/or developing. Smaller, growing markets are often desirable targets for such studies. As these markets grow larger and/or mature, previous market research becomes obsolete and may be updated and/or performed again.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
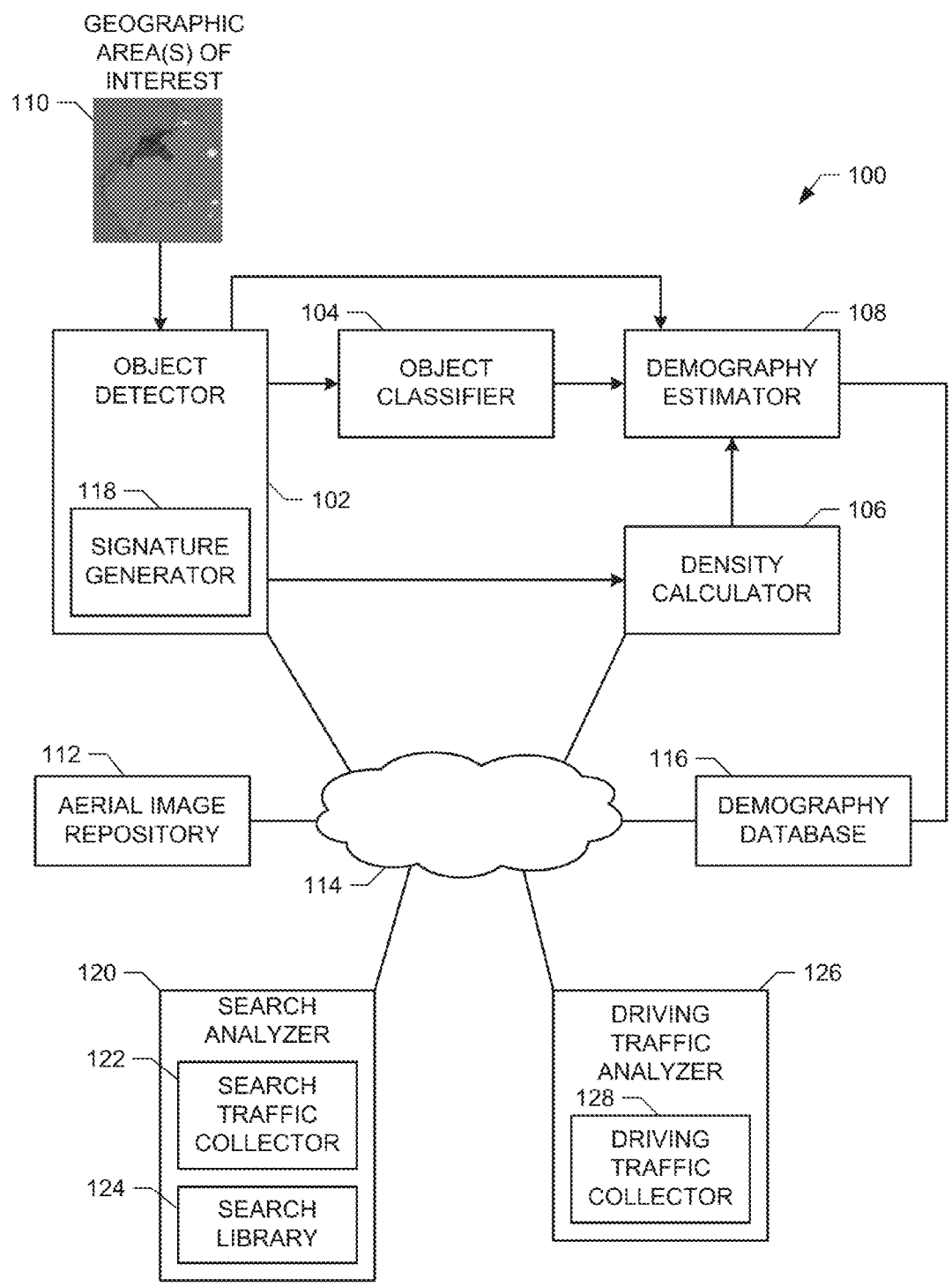
FIG. 1 is a block diagram of an example system to estimate demography based on aerial images.

Traditional methods for determining demography (e.g., household income, population density, population age, family size, etc.) of a geographic area of interest employ human surveyors. Such traditional methods suffer from many shortcomings including high costs, low temporal resolution, and/or an inability to determine demography in many areas due to dangerous conditions and/or geopolitical factors. Determining or estimating demography using known methods is sometimes impracticable or impossible in the dynamic economies of the developing world. Example methods and apparatus disclosed herein employ aerial images and data derived from actual knowledge of geographic areas ("ground truth data," such as from manually sampling an area) to inform estimates of areas that are not sampled directly by human surveyors. Example methods and apparatus disclosed herein reduce costs associated with determining demography using known methods and provide a means to estimate demographics in areas that are difficult to sample with human surveyors and/or cannot be sampled directly.

Example methods and apparatus disclosed herein enable improved estimates of demography in locations where human sampling was previously impracticable. For example, some locations may previously have required the assumption of excessive human and/or monetary risk to obtain uncertain demography information. Some example methods and apparatus disclosed herein may decrease the uncertainty of obtaining demography information and/or decrease the monetary and/or human time investments required to obtain the demography information, thereby lowering risk and increasing the practicability of performing sampling.

Example methods and apparatus disclosed herein obtain an aerial image of a geographic area for which demography is to be estimated and analyzes the aerial image to detect objects. Some such example methods and apparatus classify the objects and/or the aerial image as a whole to determine whether the objects are representative of objects or features associated with types of demographic characteristics. For example, areas indicating a higher average household income may include a number of swimming pools, have roofs of buildings that are a certain color (e.g., copper-colored in some areas, may be any color for a given area), and/or substantial green or open/undeveloped space (e.g., space on which buildings are not present, but may not necessarily be green in color). In some examples, average household income may be estimated based on distance(s) from the geographic area to a landmark or other reference location, based on the characteristics of local transportation resources (e.g., widths of nearby roadways, distance to nearby public transportation systems, etc.), and/or based on a density of buildings in the geographic area.

Example methods and apparatus disclosed herein determine whether objects are representative of demographic characteristics by comparing the aerial image of the geographic area of interest to aerial image(s) of other geographic areas for which ground truth data has been obtained (e.g., ground truth data corresponding to areas that have been manually sampled or surveyed). Based on the comparison, example methods and apparatus estimate the demography of the geographic area of interest. Example methods and apparatus identify similar geographic areas by generating a signature of the geographic area of interest and comparing the signature to reference signatures of aerial images of the geographic areas for which ground truth data has been obtained. In some examples, the signature is generated via a hash, such as a perceptual hash. In some examples, the hash may be modified to focus on the presence and/or absence of identified objects.

Example methods and apparatus disclosed herein combine aerial image-based demography estimation with search information and/or driving traffic information to more accurately estimate demography of a geographic area of interest. In some examples, searches (e.g., Internet searches through web portals such as Google or Bing) that originate from a geographic area of interest are analyzed to determine whether the topics being searched are indicative of demography. For example, the types and/or quantities of search topics in a geographic area of interest may indicate a demographic characteristic and a relevant prevalence of the characteristic in the geographic area. For example, searches pertaining to items used by children may indicate the presence of people of child-rearing ages, and the quantities of such searches indicate a number of persons of that age in the geographic area.

Example methods and apparatus disclosed herein may further collect driving traffic information (e.g., cars, buses, trucks, etc.) and determine demography and/or demography changes based on the driving traffic information. For example, higher traffic in particular areas may indicate a higher number of cars (or other vehicles) being present in a particular area or passing through the area from another area. A higher number of vehicles (e.g., cars, trucks, motorcycles, etc.) may indicate, for example, a higher relative income level.

FIG. 1 is a block diagram of an example system 100 constructed in accordance with the teachings of this disclosure to estimate demography based on aerial images. The example system 100 of FIG. 1 includes an object detector 102, an object classifier 104, a density calculator 106, and a demography estimator 108. The example system 100 of FIG. 1 uses aerial images of a geographic area of interest 110 (e.g., an area for which the demography is to be estimated), aerial images of other geographic areas, and sampling or ground truth data of the other geographic areas to estimate the demography of the geographic area of interest 110.

The example system 100 of FIG. 1 further includes an aerial image repository 112 that provides image(s) of the specified geographic area of interest 110 to a requester (e.g., via a network 114 such as the Internet). The example images may include aerially-generated images (e.g., images captured from an aircraft) and/or satellite-generated images. The images may have any of multiple sizes and/or resolutions (e.g., images captured from various heights over the geographic areas). Example satellite and/or aerial image repositories that may be employed to implement the example aerial image repository 112 of FIG. 1 are available from DigitalGlobe®, GeoEye®, RapidEye, Spot Image®, and/or the U.S. National Aerial Photography Program (NAPP). The example aerial image repository 112 of the illustrated example may additionally or alternatively include geographic data such as digital map representations, source(s) of population information, building and/or other man-made object information, and/or external source(s) for parks, road classification, bodies of water, etc.

The example system 100 of FIG. 1 further includes an example demography database 116. The example demography database 116 of FIG. 1 stores information about the demographies of geographic areas. The demographic information stored in the demography database 116 of the illustrated example includes government and/or private census data, survey and/or sampling data, geographic data, and/or any other type of demography information. The example demography database 116 of FIG. 1 stores the demographic information in association with geographic information (e.g., global positioning system (GPS) coordinates) corresponding to the demographic information. The example demography database 116 of FIG. 1 may further store a count and/or estimation of objects detectable in the aerial image of the geographic locations for which demographic information is known.

The example demography database 116 of FIG. 1 responds to a request for demographic information for an area defined by coordinates by returning the requested demographic information. In some examples, the demography database 116 scales, extrapolates, and/or otherwise adjusts demographic information for requested areas that do not precisely correspond to the geographic information stored in the demography database 116.

The example object detector 102 of FIG. 1 obtains (e.g., requests and receives, accesses from storage, etc.) an aerial image of the geographic area of interest 110 from the aerial image repository (e.g., via the network 114). Using the aerial image, the example object detector 102 detects objects in the geographic area. The example object detector 102 of FIG. 1 may use color analysis, edge detection, and/or any other suitable automatic image analysis technique and/or object definitions to identify objects. Example objects include roofs, green spaces, swimming pools, landmarks, and/or roadways. The example object detector 102 of the illustrated example further detects characteristics of the example geographic area based on the aerial image. For example, the object detector 102 of the illustrated example determines a distance from the geographic area (e.g., a particular position in the geographic area) to a landmark or other reference location, which may or may not be within the aerial image.

The example object classifier 104 of FIG. 1 classifies the objects detected by the object detector 102. The object classifier 104 of the illustrate example classifies objects by analyzing locations in the aerial image corresponding to the objects detected by the object detector 102. Example objects that may be detected by the object classifier 104 include swimming pools, structure roofs of a designated type, green spaces, landmarks, distances to one or more reference location(s), or a roadway having a width within a designated range. The example object classifier 104 of FIG. 1 further determines a density of buildings in the geographic area based on the aerial image.

To detect whether an object is a swimming pool, the example object classifier 104 of FIG. 1 determines whether the color of the object in the aerial image is within a color range (e.g., dark blue to light blue) and whether the area of the object is less than an upper threshold (e.g., to avoid classifying larger bodies of water as swimming pools). In some examples, the object classifier 104 further determines whether the color of the object is greater than a lower threshold.

To detect whether an object is a green space, the object classifier 104 of the illustrated example determines whether the color of the object corresponds to that of local green space. While some green space may be in the green color range, other green space may be in other color ranges (e.g., a brown or red color range). In some examples, the object classifier 104 determines whether the object is at least a threshold size (e.g., to discount negligible green spaces). In some other examples, the object classifier 104 does not filter green spaces based on size when all green spaces are considered to be representative of demographic characteristics.

To detect whether the object is a roof of a designated color, the object classifier 104 of the illustrated example determines whether the color of the object is within a color range of the roof type of interest. The color of a roof type may be different for different geographic areas and may indicate different income ranges (e.g., lower than average, average, higher than average, etc.). For example, in some areas a copper-colored roof indicates a higher average income, while in other areas a white-colored or black-colored roof may indicate a higher average income. The example color range(s) may include colors based on shadows of the color range(s) of interest. In some examples, the object classifier 104 determines whether the object has one of a number of shapes consistent with that of a building of interest and/or whether the object is less than an upper threshold size to increase the likelihood that the identified object is a roof.

To detect whether the object is a roadway of a particular width, the object classifier 104 of the illustrated example determines a scale of the aerial image to the geographic area (e.g., 50 meters per inch, 1 meter per pixel, etc.). The example object classifier 104 of the illustrated example converts the width of the roadway into actual distance.

The example object detector 102 of FIG. 1 determines a signature of the aerial image (e.g., a portion of the aerial image corresponding to the geographic area of interest 110). To this end, the example object detector 102 includes a signature generator 118, which generates the signature of the aerial image. Generating the signature may include cropping or limiting the aerial image to the portion of the aerial image that corresponds to the geographic area of interest 110. In some examples, the signature generator 118 performs a hash of the aerial image, such as a perceptual hash. In some other examples, the signature generator 118 generates a signature based on the detected and/or classified objects.

The example demography estimator 108 of FIG. 1 receives the classifications (e.g., a swimming pool, a first type of structure roof, a green space, a distance range to a reference location, or a roadway width range) of the objects from the object classifier 104 and a signature of the aerial image from the signature generator 118. The example demography estimator 108 of FIG. 1 communicates with the demography database 116 to request geographic areas and corresponding demographies of geographic areas that are similar to the geographic area of interest 110 based on the number(s) and/or classification(s) of the objects in the aerial image of the geographic area of interest 110. For example, the demography estimator 108 may query the demography database 116 using the number(s) and/or classification(s) of the objects in the aerial image and providing a threshold similarity to the objects. The example demography database 116 returns to the demography estimator 108 any geographic areas that are within the threshold similarity to the geographic area of interest 110 based on the numbers and/or classifications of the objects, and the demographies corresponding to the returned geographic areas.

Additionally or alternatively, the example demography estimator 108 of FIG. 1 communicates with the demographic database 116 to request geographic areas and corresponding demographies that are similar to the geographic area of interest 110 based on the signature of the aerial image and based on signatures stored in the example demography database 116. For example, the demography estimator 108 may query the demography database 116 using the signature of the aerial image as a key and providing a threshold similarity to the signature. The example demography database 116 returns to the demography estimator 108 any geographic areas that are within the threshold similarity to the geographic area of interest 110 based on the signatures, and the demographies corresponding to the returned geographic areas.

Based on the classifications of the objects in the aerial image, the density of objects in the aerial image, and/or the signature of the aerial image, and based on the demographies received from the demography database 116, the example demography estimator 108 of FIG. 1 estimates the demography of the geographic area of interest. For example, the demography estimator 108 of the illustrated example weights and/or combines the demographies received from the demography database 116 based on relative similarities of the geographic areas returned by the demography database 116 (e.g., determined based on object classifications and/or signatures) to the geographic area of interest 110. In the example of FIG. 1, the demography estimator 108 gives higher weights to the demographies of areas that are more similar to the geographic area of interest 110 and lower weights to the demographies of areas that are less similar. The example demography estimator 108 may further weight the demographies of the areas based on relative sizes of the geographic areas to the geographic area of interest 110.

The example demography estimator 108 of the illustrated example estimates the demography based on the weighted and/or scaled demographies by, for example, averaging the weighted and/or scaled demographies (e.g., root-mean-squared averaging, determining the mean, etc.). The example demography estimator 108 of the illustrated example then outputs the estimated demography and/or stores the estimated demography in the demography database 116 in association with a definition of the geographic area of interest 110, with a timestamp, with the aerial image of the geographic area of interest 110, with the signature of the aerial image, and/or with the classifications of the objects in the aerial image.

The example system 100 of FIG. 1 may repeat estimation of the demography of the geographic area of interest 110 at different times (e.g., quarterly, bi-annually, annually, etc.) to monitor the development of the geographic area of interest 110 over time and/or to predict future development. The demography may be used to, for example, identify emerging markets and/or a developing potential for marketing goods and services to an underserved demographic.

The example system 100 of FIG. 1 further includes a search analyzer 120 to determine demography information based on searches (e.g., Internet searches) performed from the geographic area of interest. The example search analyzer 120 includes a search traffic collector 122. The example search traffic collector 122 of FIG. 1 collects search information occurring from locations (e.g., IP addresses) within the geographic area of interest 110. For example, the search traffic collector 122 of FIG. 1 receives search information (e.g., search terms for searches performed) from search providers, such as Google, Bing, Yahoo!, and/or any other search or other Internet providers (e.g., Amazon.com, etc.) of interest. To obtain the search information, the search traffic collector 122 determines IP addresses corresponding to the geographic area of interest (e.g., from Internet service providers serving the geographic area of interest), and requests searches corresponding to the IP addresses. In other examples, the entity conducting the study recruits panelists to participate in the study and downloads online meters to the panelists' computers or other Internet access devices to automatically collect data indicative of interests (e.g., URLs, search terms, etc.).

Irrespective of how the data is collected, upon receiving the search information, the example search analyzer 120 of FIG. 1 determines demographic characteristics of the area based on a qualitative analysis of the search topics or terms. For example, the search analyzer 120 may compare the search topics to a search library 124 that correlates search topics to demographic characteristics. The example search analyzer 120 may further determine a number of each type of search or class of search (e.g., searches having particular keyword(s)) to determine a prevalence of demographic characteristics in the geographic area of interest 110. For example, a higher number of a particular search topic may be indicative of a higher number of persons having a corresponding demographic characteristic in the geographic area of interest 110.

The example search analyzer 120 of FIG. 1 additionally or alternatively obtains a comparison of demographic characteristics to search topics from the example demography database 116. The example search analyzer 120 may compare types and/or quantities of search topics from the geographic area of interest 110 to types and/or quantities of search topics stored in the demography database 116. Based on the comparisons and the demographic characteristics received from the demography database 116 in association with the search topics, the example search analyzer 120 of FIG. 1 determines corresponding estimated demographic characteristics for the geographic area of interest. The example search analyzer 120 and/or the example driving traffic analyzer 126 provide the estimated demography information to the example demography estimator 108, which combines the search-based demography estimates, traffic-based demography estimates, and/or aerial image-based estimates of demography to determine an overall estimate of demography.

The example driving traffic analyzer 126 of FIG. 1 analyzes driving traffic in the geographic area of interest 110 to estimate demography information. The example driving traffic analyzer 126 includes a driving traffic collector to obtain driving traffic information for the geographic area of interest. Example sources of driving traffic information include publicly available traffic databases such as Google Maps. Example traffic information shows color-coded overlays on a map of a roadway to indicate relative speeds of traffic over the corresponding portion of the roadway. In some examples, the driving traffic collector 128 obtains traffic information for areas outside of the geographic area of interest 110 (e.g., because many persons having an abode within the geographic area of interest 110 may commute or otherwise travel to places outside of the geographic area of interest 110).

The example traffic analyzer 126 of FIG. 1 analyzes the traffic information (e.g., interprets the color-coded overlay) and converts the traffic information to a number of cars (and/or other vehicles such as trucks and/or motorcycles, etc.) associated with the example geographic area of interest. The example traffic analyzer 126 further identifies flows of traffic (e.g., based on times of day) to identify the sources of the traffic and/or a proportion of the traffic that originates in the geographic area of interest. The example traffic analyzer 126 combines the traffic originating in the geographic area of interest 110 with traffic arriving at a destination (e.g., a downtown area, an industrial area, etc.) and characteristics of persons associated with the destinations (e.g., higher income, lower income, etc.) to estimate one or more characteristics of the geographic area of interest 110. Similarly, the example traffic analyzer 126 may determine an amount of traffic terminating in the geographic area of interest 110 to determine, for example, a level of commercial, retail, and/or industrial activity occurring within the geographic area of interest 110.

The example driving traffic analyzer 126 provides the driving traffic information to the example demography estimator 108. The example demography estimator 108 considers the traffic information when estimating the demography of the example geographic area of interest 110.

In some examples, the driving traffic analyzer 126 analyzes the aerial image of the geographic area of interest 110 to identify one or more parking lots (e.g., a space having a black or other color and having a number of car-type objects) and/or roadside parking areas (e.g., spaces having a number of car-type objects in a line adjacent a roadway). The example driving traffic analyzer 126 may combine the traffic information (e.g., originating and/or terminating traffic information) with the parking lot data to further estimate the number of cars in the geographic area of interest 110.

Figure 2:
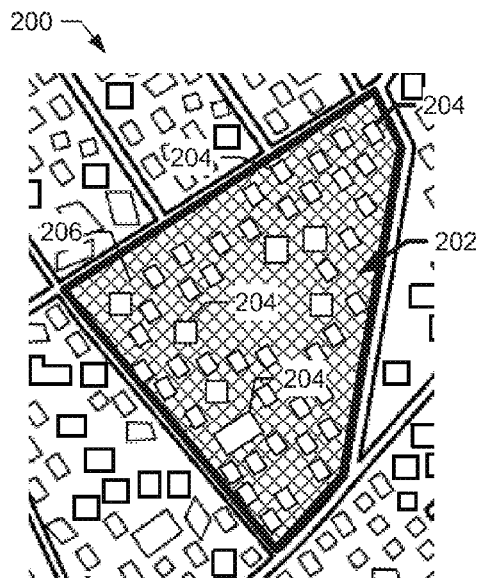
FIG. 2 illustrates an example aerial image of a first example geographic area in which the system of FIG. 1 may detect a relatively high amount of green space.

FIG. 2 illustrates an example aerial image 200 of a first example geographic area 202 in which the system 100 of FIG. 1 may detect a relatively high amount of green space. The image 200 of FIG. 2 may be processed by the example object detector 102, the example object classifier 104, the example density calculator 106, and/or the example signature generator 118 of FIG. 1.

As illustrated in FIG. 2, the example geographic area 202 includes multiple buildings 204 generally intermixed with green space 206 (illustrated by cross-hatching in FIG. 2). The example object detector 102 of FIG. 1 may detect the buildings 204 and the green space 206 based on, for example, the shapes of the buildings 204 and the color of the aerial image representing the green space 206. The example object classifier 104 of FIG. 1 classifies the example buildings 204 and/or determines whether the buildings have a particular color of roof. The example density calculator 106 of FIG. 1 calculates a density of the buildings 204 (e.g., a number of buildings 204 and/or an area occupied by the buildings per unit area) and/or calculates a density of the green space 206 (e.g., a number of distinct green spaces separated by non-green spaces and/or an amount of green space per unit area).

Figure 3:
FIG. 3 illustrates an example aerial image of a second example geographic area in which the system of FIG. 1 may detect a relatively higher building density than the first geographic area of FIG. 2.

FIG. 3 illustrates an example aerial image 300 of a second example geographic area 302 in which the system of FIG. 1 may detect a relatively higher building density than the first geographic area 202 of FIG. 2. The example geographic area 302 of FIG. 3 includes a number of buildings 304. The example density calculator 106 of FIG. 1 may calculate the density of the buildings 304 in the geographic area 302, which is higher than the density of the buildings 204 in the example geographic area 202 of FIG. 2. The density may be based on a number of objects detected and/or based on an area occupied by the objects relative to the size of the geographic area 202.

Figure 4:
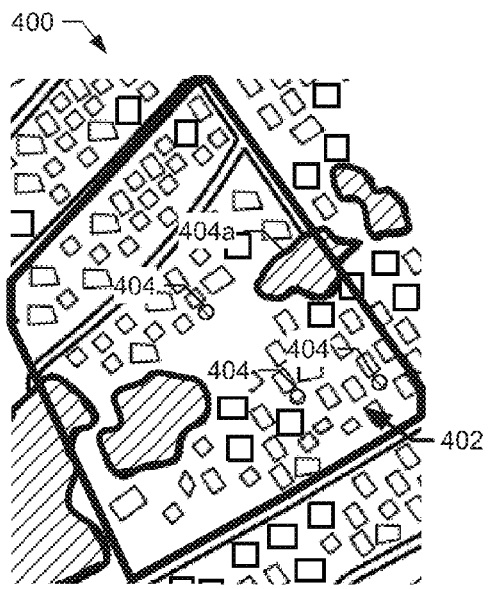
FIG. 4 illustrates an example aerial image of a third example geographic area in which the system of FIG. 1 may detect a number of swimming pools.

FIG. 4 illustrates an example aerial image 400 of a third example geographic area 402 in which the example system 100 of FIG. 1 may detect a number of swimming pools 404. The example object detector 102 and the example object classifier 104 of FIG. 1 may identify and classify the swimming pools 404 based on the color of the aerial image in the locations of the swimming pools 404 and the sizes of the swimming pools 404. The example object classifier 104 of FIG. 1 classifies the swimming pool 404a as a swimming pool (e.g., as a public swimming pool) based on the size (e.g., a size falling between lower and upper thresholds), but does not classify a body of water 406 as a swimming pool due to the size of the body of water 406 (e.g., the water 406 has a size greater than the upper threshold). While example swimming pools 404 and bodies of water 406 are illustrated in FIG. 4, the threshold size between a body of water and a swimming pool may be different than an example threshold used by the example object classifier 104 of FIG. 1 to distinguish the example swimming pools 404 and the example bodies of water 406 of FIG. 4. For example, private and/or public swimming pools may be sized differently in different geographic areas. The example object classifier 104 of FIG. 1 may further determine whether objects are swimming pools based on the presence and/or absence of straight lines. For example, larger public swimming pools may be defined by one or more straight lines. However, shorelines of large bodies of water may also appear to be a straight line. Accordingly, the example object classifier 104 of FIG. 1 performs the classification of swimming pools based on a combination of straight lines, shapes (e.g., kidney shaped pools), and/or sizes.

Figure 5:
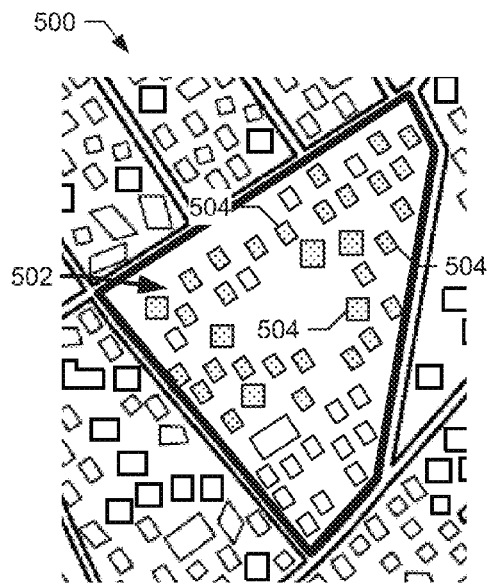
FIG. 5 illustrates an example aerial image of a fourth example geographic area in which the system of FIG. 1 may detect buildings having a first roof type.

FIG. 5 illustrates an example aerial image 500 of a fourth example geographic area in which the system of FIG. 1 may detect buildings 502 having a first roof type. The example object classifier 104 of FIG. 1 classifies the example buildings 504 by determining a color of the buildings 504 and comparing the color to a color range. The example object classifier 104 may further compare a size of the buildings 504 to an upper threshold and/or to a lower threshold. In some examples, the object classifier 104 determines whether the shape of the buildings 504 are typical of buildings of interest (e.g., square, rectangular, and/or polygonal objects are consistent with housing units, while circular, oval, or irregularly shaped objects are not consistent with housing units in some areas).

Figure 6:
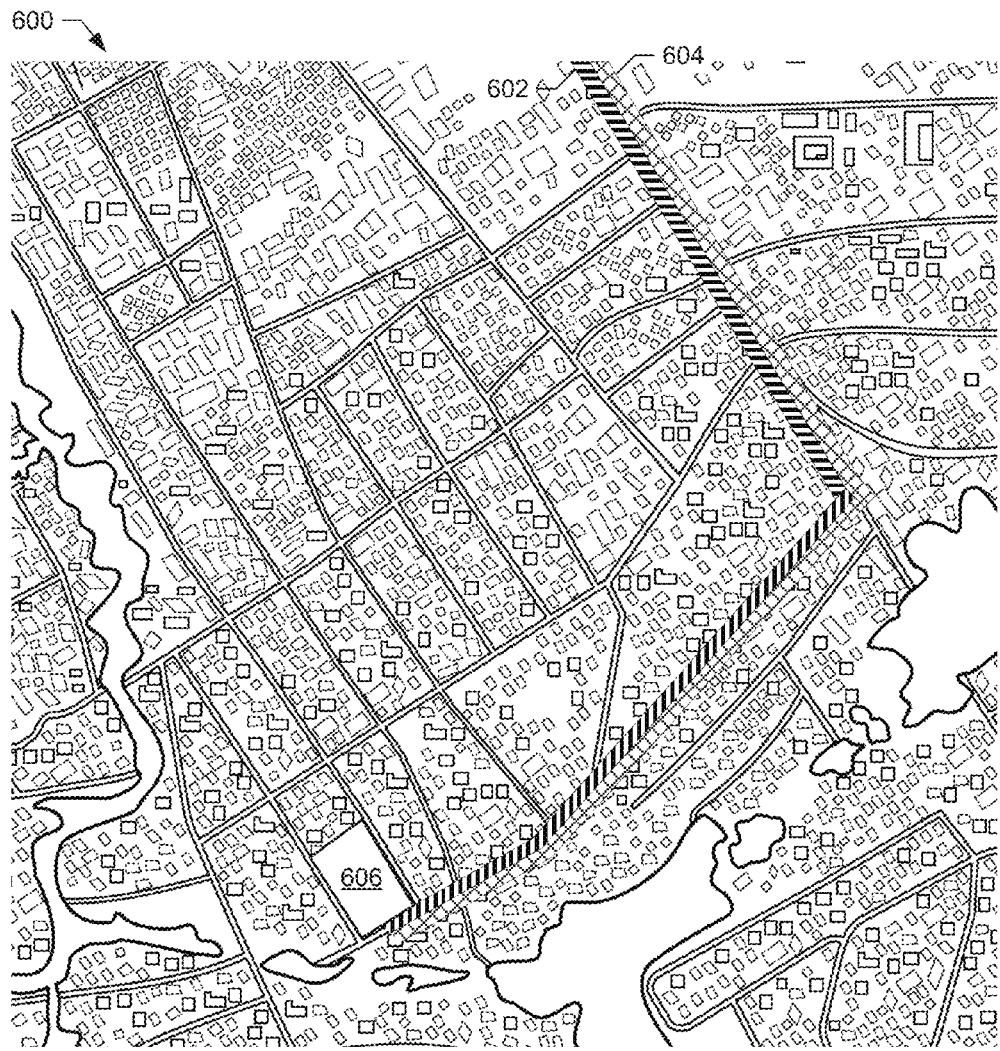
FIG. 6 illustrates an example aerial image of a fifth example geographic area 600 in which the system of FIG. 1 may analyze traffic information.

FIG. 6 illustrates an example aerial image of a fifth example geographic area 600 in which the system of FIG. 1 may analyze traffic information. The example aerial image of FIG. 6 includes an overlay on which different traffic speeds are illustrated. A first illustrated traffic indicator 602 illustrates that a first driving traffic flow along a first path is traveling at a first (e.g., faster) speed range. A second illustrated traffic indicator 604 illustrates that a second driving traffic flow along the first path, in the opposite direction, is traveling at a second (e.g., slower speed range). The example traffic analyzer 126 of FIG. 1 may analyze the traffic indicators 602, 604, the beginning and ending points of the traffic indicators 602, 604, and/or any indications of parking lots (e.g., a parking lot 606) to identify that the traffic associated with the indicator 602 originates in the geographic area 600, and the traffic associated with the indicator 604 terminates in the geographic area 600.

While an example manner of implementing the system 100 is illustrated in FIG. 1, one or more of the elements, processes and/or devices illustrated in FIG. 1 may be combined, divided, re-arranged, omitted, eliminated and/or implemented in any other way. Further, the example object detector 102, the example object classifier 104, the example density calculator 106, the example demography estimator 108, the example aerial image repository 112, the example demography database 116, the example signature generator 118 and/or, more generally, the example system 100 of FIG. 1 may be implemented by hardware, software, firmware and/or any combination of hardware, software and/or firmware. Thus, for example, any of the example object detector 102, the example object classifier 104, the example density calculator 106, the example demography estimator 108, the example aerial image repository 112, the example demography database 116, the example signature generator 118 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example object detector 102, the example object classifier 104, the example density calculator 106, the example demography estimator 108, the example aerial image repository 112, the example demography database 116, and/or the example signature generator 118 is/are hereby expressly defined to include a tangible computer readable storage device or storage disk such as a memory, a digital versatile disk (DVD), a compact disk (CD), a Blu-ray disk, etc. storing the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Flowcharts representative of example machine readable instructions for implementing the system 100 of FIG. 1 are shown in FIGS. 7, 8A, 8B, 9, 10, and/or 11. In this example, the machine readable instructions comprise programs for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example programs are described with reference to the flowcharts illustrated in FIGS. 7, 8A, 8B, 9, 10, and/or 11, many other methods of implementing the example system 100 may alternatively be used. For example, the order of execution of the blocks may be changed, and/or some of the blocks described may be changed, eliminated, or combined.

As mentioned above, the example processes of FIGS. 7, 8A, 8B, 9, 10, and/or 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 7, 8A, 8B, 9, 10, and/or 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

Figure 7:
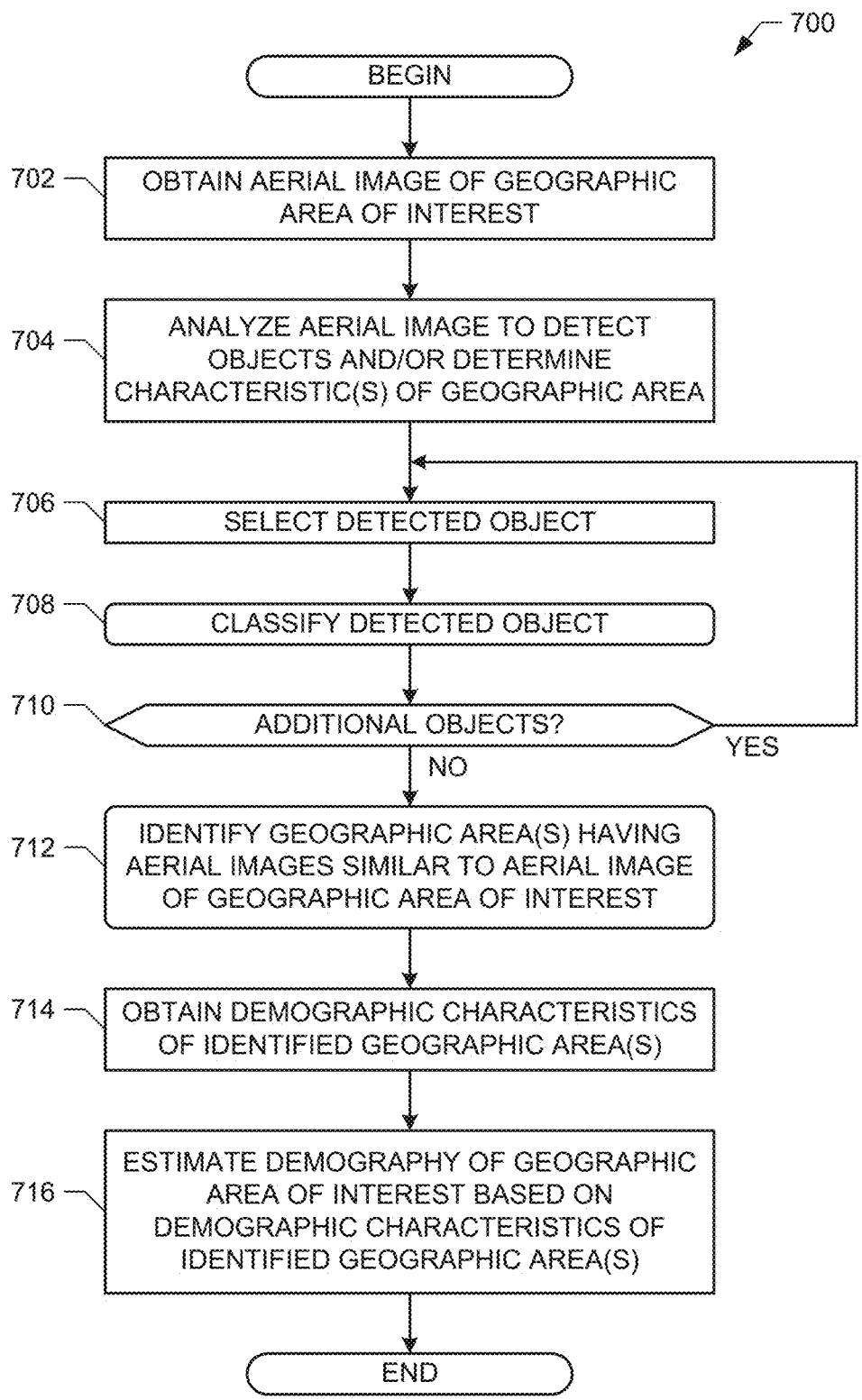
FIG. 7 is a flowchart representative of example machine readable instructions which, when executed, cause a processor to implement the example system of FIG. 1 to estimate a demography of a geographic area of interest.

FIG. 7 is a flowchart representative of example machine readable instructions 700 which, when executed, cause a processor to implement the example system 100 of FIG. 1 to estimate a demography of a geographic area of interest. The example instructions 700 of FIG. 7 may be executed to implement the example object detector 102, the example object classifier 104, the example density calculator 106, the example density estimator 108, the example aerial image repository 112, and the example demography database 116.

The example object detector 102 obtains (e.g., receives, accesses from storage) an aerial image of a geographic area of interest 110 (block 702). For example, the object detector 102 may request and receive the aerial image from the example aerial image repository 112 of FIG. 1. The example object detector 102 and/or the example density calculator 106 of FIG. 1 analyzes the aerial image (e.g., using image analysis techniques) to detect objects and/or determine characteristics of the geographic area (block 704). For example, the object detector 102 may detect objects and/or determine characteristics based on the aerial image based on shapes, colors, and/or boundaries in the image. Additionally or alternatively, the example density calculator 106 may determine a density of one or more objects in the aerial image.

The example object classifier 104 of FIG. 1 selects a detected object (block 706) and classifies the selected object (block 708). For example, the object classifier 104 may determine a type of the object based on characteristics of the object. In some examples, one or more of the objects may not be classified or may be classified as an unknown type if, for example, the object is not classified as one of a set of objects. Example instructions that may be executed to implement block 708 are described below with reference to FIGS. 8A and 8B. The object classifier 104 determines whether there are any additional objects to be classified (block 710). If there are additional objects (block 710), control returns to block 706 to select another object to be classified.

When the detected objects have been classified and there are no additional objects (block 710), the example demography estimator 108 identifies geographic area(s) having aerial images similar to the aerial image of the geographic area of interest (block 712). For example, the demography estimator 108 may request geographic areas and/or aerial images from the example demography database 116 based on a signature generated by the signature generator 118 and/or object classifications determined by the object classifier 104. Example instructions that may be executed to implement block 712 are illustrated below with reference to FIG. 9.

The example demography estimator 108 obtains demographic characteristics of the identified geographic region(s) (block 714). For example, the demography estimator 108 may receive the demographic characteristics (e.g., population, household income, household population, ages, genders, etc.) of the geographic areas identified by the demography database 116.

The demography estimator 108 estimates the demography of the geographic area of interest 110 of FIG. 1 based on the demographic characteristics of the identified geographic area(s) (block 716). For example, the demography estimator 108 may weight and/or scale the demographic characteristics of the identified geographic areas based on respective similarities between the identified geographic areas and the geographic area of interest 110 (e.g., based on object classifications, numbers, geographic area characteristics such as object density, and/or signatures of the aerial images). The demography estimator 108 may then average or otherwise combine the demographic characteristics to estimate the demographic characteristics of the geographic area of interest 110. In some examples, the example demography estimator 108 estimates the demography of the geographic area of interest 110 by imputing demographic characteristics of a second geographic area stored in the demography database 116 to the example geographic area of interest 110 based on similarity between respective signatures and/or object classifications. The example instructions 700 of FIG. 7 may then end.

Figure 8A:
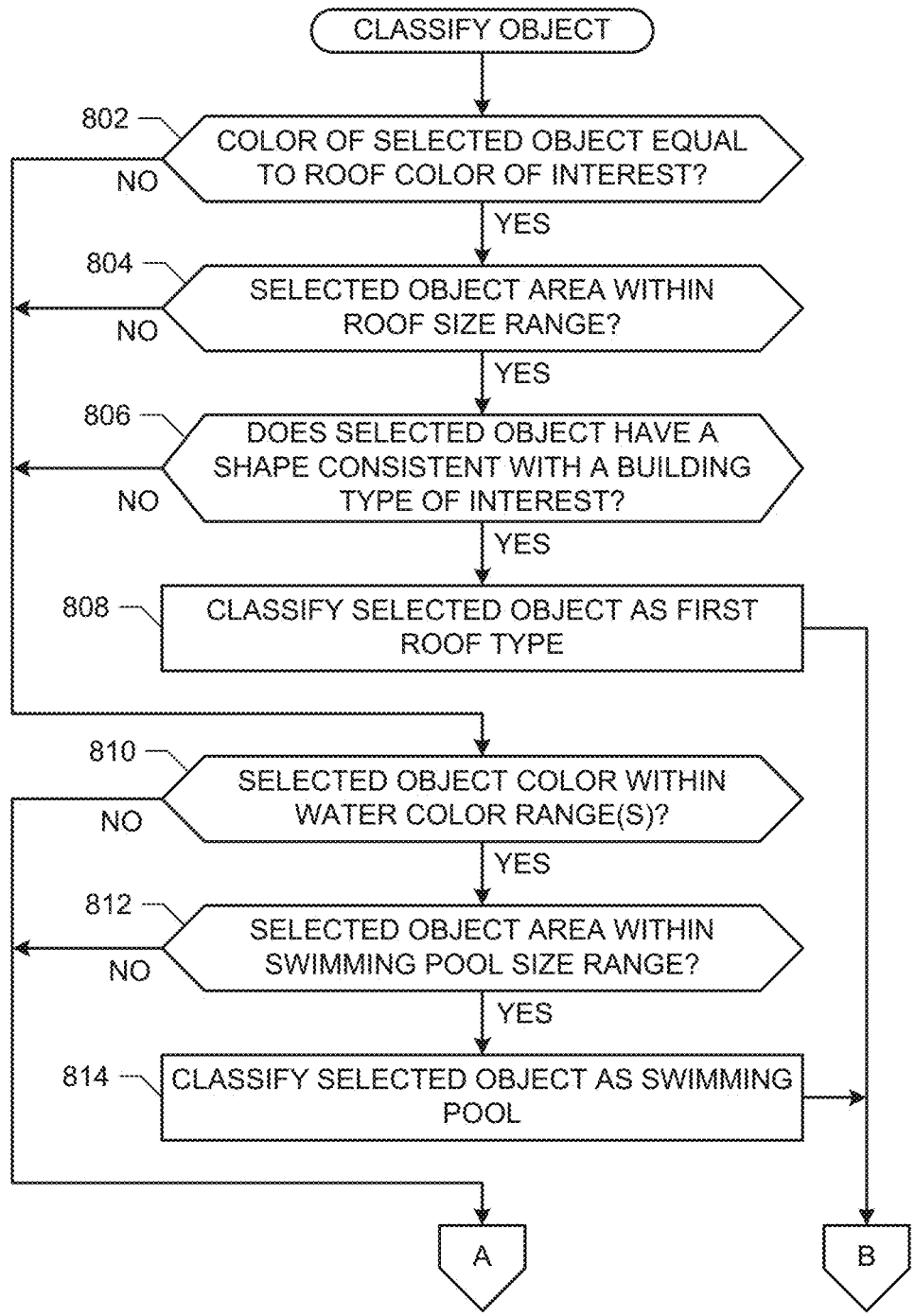
FIGS. 8A and 8B collectively illustrate a flowchart representative of example machine readable instructions which, when executed, cause a processor to implement the example object classifier of FIG. 1 to classify an object detected in an aerial image.
Figure 8B:
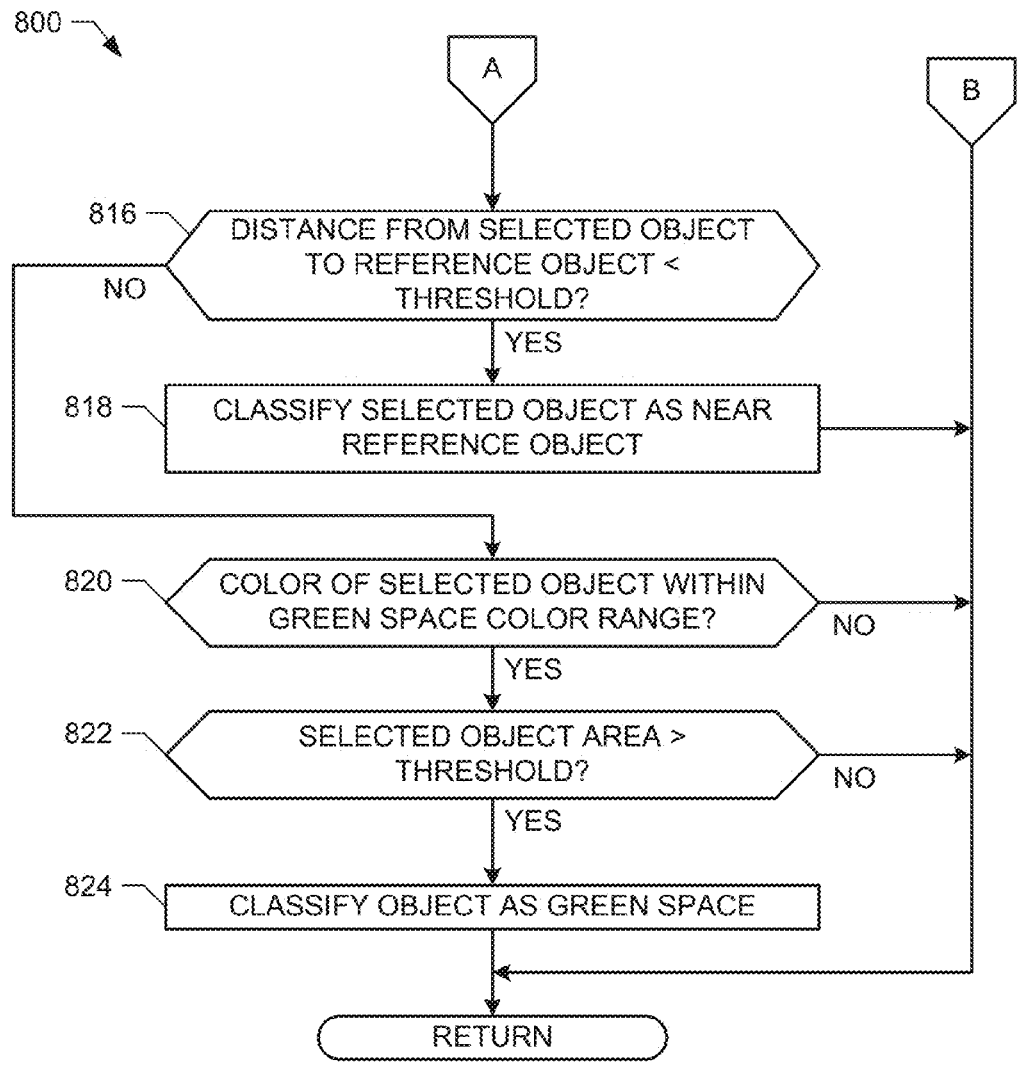

FIGS. 8A and 8B show a flowchart representative of example machine readable instructions 800 which, when executed, cause a processor to implement the example object classifier 104 of FIG. 1 to classify an object detected in an aerial image. The example instructions 800 of FIGS. 8A and 7B may be executed to implement block 708 of FIG. 7 to classify a selected object. The example instructions 800 are described below with reference to a selected object (block 706 of FIG. 7).

Referring to FIG. 8A, the example object classifier 104 determines whether a color of the selected object is equal to a roof color of interest (e.g., determined based on color values such as Red-Green-Blue (RGB) encoded values) (block 802), whether the object area is within a size range (e.g., less than an upper threshold and/or greater than a lower threshold) (block 804), and whether the selected object has a shape consistent with that of a building of interest (e.g., a house) (block 806). The example roof color of interest may be a color range and/or may consider the effects of shadows in the aerial image. The example roof size range may be selected to represent adequate building sizes to represent the building of interest (e.g., houses, apartment buildings, etc.). The acceptable shape(s) may be selected to filter natural objects (e.g., objects not having straight lines) or other building shapes. If the color of the selected object is a roof color of interest (block 802), the selected object area is within a roof size range (block 804), and the selected object has a shape consistent with that of a building of interest (block 806), the example object classifier 104 classifies the object as a roof of a first type.

If the object classifier 104 determines that the color of the selected object is not a roof color of interest (block 802), that the selected object area is too large or too small (block 804), or that the selected object has an irregular shape (block 806), the example object classifier 104 determines whether the object color is within one or more water color range(s)

(block 810) whether the object area is within a swimming pool size range (block 812). The water color range(s) may be selected based on the effects of different substances beneath the swimming pool water, the potential depths of the water, the effects of shadows, unfilled swimming pools, and/or other considerations that may affect the observed color of swimming pools. The swimming pool size range may be selected based on observed ranges of private and public swimming pools. If the selected object color is within a water color range (block 810), and the selected object area is within a swimming pool size range (block 812), the example object classifier 104 classifies the selected object as a swimming pool (block 814). In some examples, classification of a swimming pool may be based on the presence of straight lines in the object and/or based on a shape of the object.

Referring to FIG. 8B, if the selected object color is outside of the water color range(s) (block 810), or the selected object area is not within a swimming pool size range (e.g., the object is too small or too large) (block 812), the example object classifier 104 determines whether the distance from the selected object to the reference object is less than a threshold (block 816). If the distance is less than a threshold (block 818), the example object classifier 104 classifies the selected object as near reference object (block 818). The example selected object may be an object selected by the object detector 102 to determine the distance from the geographic area of interest 110 to the reference object. The example reference object may be a point of interest and/or a landmark, or any other reference object for which a distance from the object is indicative of at least one demographic characteristic of an area. In some examples, the object classifier 104 executes blocks 816 and 818 in addition to classifying an object as another type of object (e.g., a swimming pool, a roof, a green space, a landmark, etc.).

If the distance is at least a threshold distance (block 816), the example object classifier determines whether a color of the selected object is within a green space color range (block 820) and whether the object area is greater than a size threshold (block 822). The green space color range may be selected to be representative of green spaces (e.g., parks, developed natural areas, green spaces on personal property such as front yards and/or back yards, etc.) for the geographic area of interest. For example, a first geographic region may have different terrain than a second geographic region, necessitating different vegetation and/or other considerations for local green spaces in the respective regions. The threshold object size for green spaces may be a lower threshold to avoid counting negligible green spaces and/or other non-green space objects that may not be representative of demographic characteristics. If the color of the selected object is within the green space color range (block 820) and the object area in greater than the threshold (block 822), the example object classifier 104 classifies the object as a green space (block 824).

After classifying the object (blocks 808, 814, 818, or 824), or if the object is not classified (blocks 820, 822), the example instructions 800 of FIG. 8B return the classification or lack of classification of the selected object and return control to block 710 of FIG. 7.

Figure 9:
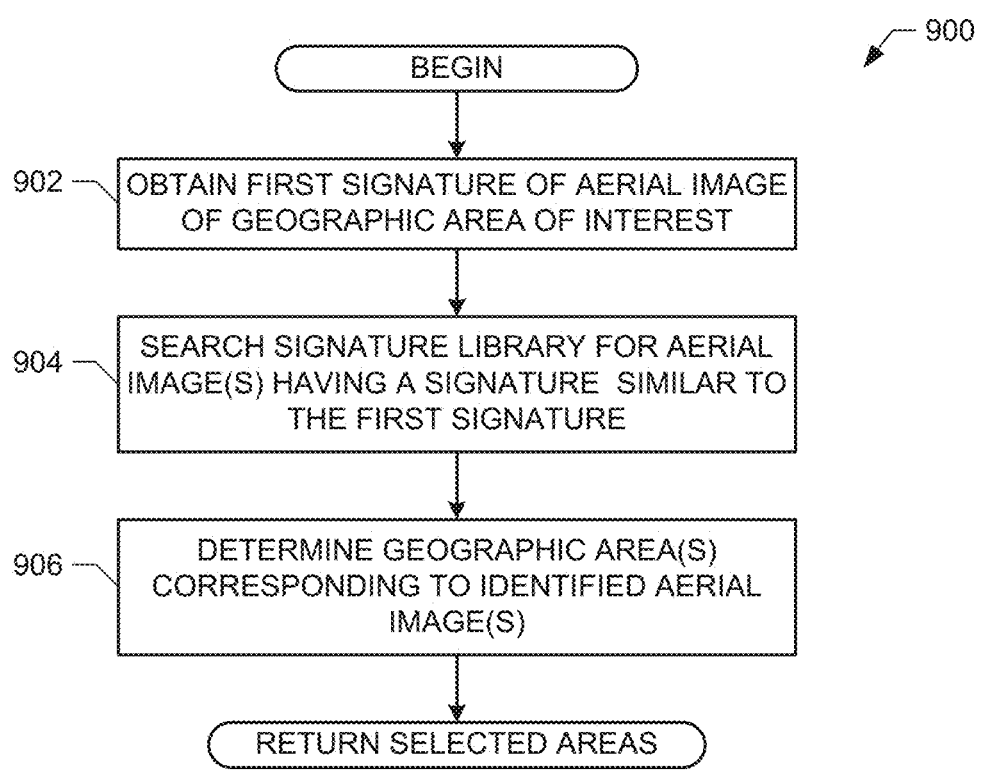
FIG. 9 is a flowchart representative of example machine readable instructions which, when executed, cause a processor to implement the example demography database of FIG. 1 to identify geographic areas similar to the geographic area of interest.

FIG. 9 is a flowchart representative of example machine readable instructions 900 which, when executed, cause a processor to implement the example system of FIG. 1 to identify geographic areas similar to the geographic area of interest 110. The example instructions 900 of FIG. 9 may be executed by the example demography database 116 of FIG. 1 to implement block 712 of FIG. 7 to identify geographic area(s) having aerial images similar to the aerial image of a geographic area of interest.

The example demography database 116 obtains (e.g., receives, accesses from storage, etc.) a first signature of an aerial image of the geographic area of interest 110 (block 902). For example, the demography estimator 108 may receive the example signature (e.g., a hash) from the signature generator 118 and/or from the example demography estimator 108 of FIG. 1.

The example demography database 116 searches a signature library for aerial image(s) having a signature similar to the first signature (block 904). For example, the demography estimator 108 may query the demography database 116 using the signature of the first aerial image. The example demography database 116 returns similar aerial image(s) based on the signature and signature(s) of the aerial images stored in the demography database 116. In some examples, the search or query is constrained based on a geographic region of which the geographic area of interest is a portion, based on a threshold similarity (or difference), and/or based on areas for which the demography database 116 has associated demographic information stored.

The example demography database 116 determines geographic area(s) corresponding to the identified aerial image(s) (block 906). For example, when the demography database 116 has identified similar aerial images (block 906), the example demography database 116 determines the geographic locations corresponding to the aerial images (block 906). In some examples, the aerial images are mapped to the geographic areas in the demography database 116. The example instructions 900 may then end, return the selected geographic areas to the demography estimator 108, and return control to block 714 of FIG. 7.

Figure 10:
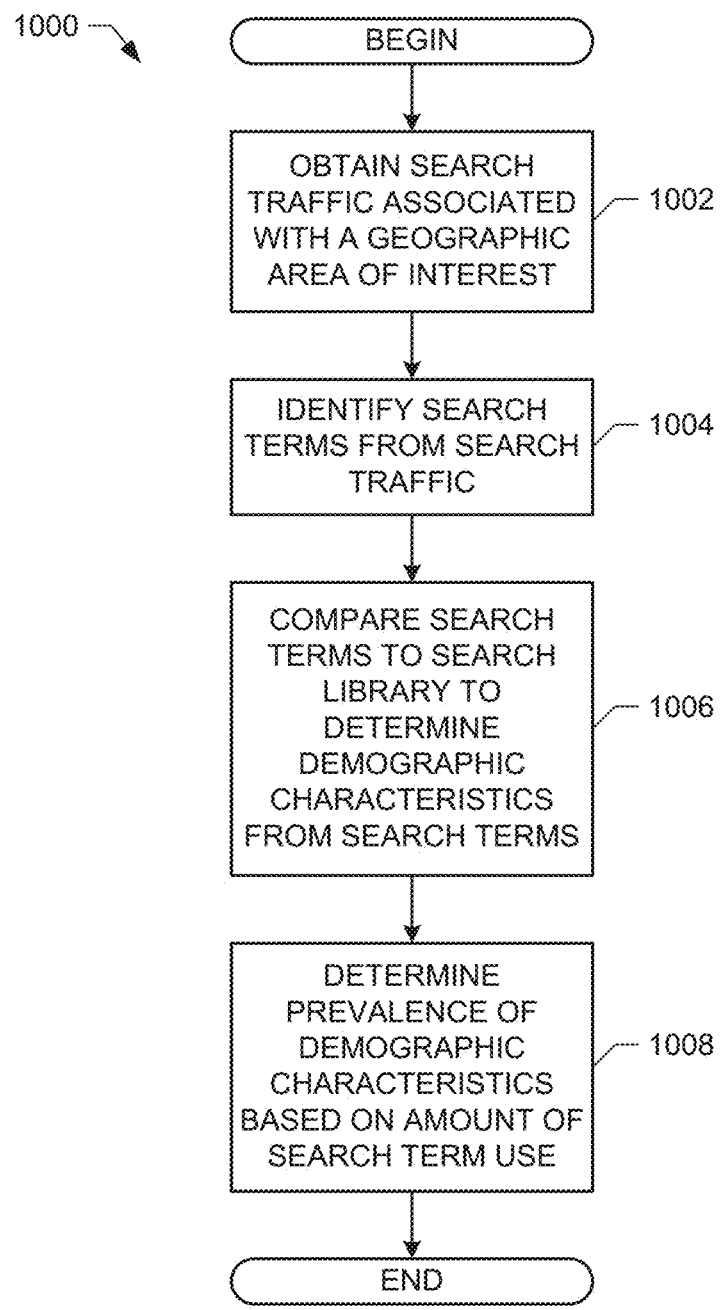
FIG. 10 is a flowchart representative of example machine readable instructions which, when executed, cause a processor to implement the example search analyzer, the example search traffic collector, and/or the example search library to analyze search information to estimate demographic characteristic(s) of a geographic area.

FIG. 10 is a flowchart representative of example machine readable instructions 1000 which, when executed, cause a processor to implement the example search analyzer 120, the example search traffic collector 122, and/or the example search library 124 to analyze search information to estimate demographic characteristic(s) of a geographic area.

The example search traffic collector 122 of FIG. 1 obtains (e.g., receives, accesses from storage, etc.) search traffic originating from a geographic area of interest (block 1002). For example, the search traffic collector 122 of FIG. 1 receives search information from search providers, such as Google, Bing, Yahoo!, and any other search providers of interest. To obtain the search information, the search traffic collector 122 determines IP addresses corresponding to the geographic area of interest (e.g., from Internet service providers serving the geographic area of interest), and requests searches corresponding to the IP addresses.

The example search analyzer 120 of FIG. 1 identifies search terms from the search traffic (block 1004). For example, the search analyzer 120 may group searches by keywords. The example search analyzer 120 compares search terms to search terms in the example search library 124 to determine demographic characteristics from the search terms (block 1006). The example search analyzer 120 determines a prevalence of demographic characteristics based on an amount of search term or types of search term used (block 1008). For example, the example search analyzer 120 may determine a number of each type of search or class of search (e.g., searches having particular keyword(s)) to determine a prevalence of demographic characteristics in the geographic area of interest 110. A higher number of a particular search topic may be indicative of a higher number of persons having a corresponding demographic characteristic in the geographic area of interest 110.

The example instructions 1000 of FIG. 10 then end. The example search analyzer 120 of FIG. 1 may provide the estimated demography information determined from the search information to the demography estimator 108 of FIG. 1 to be combined with information from aerial images.

Figure 11:
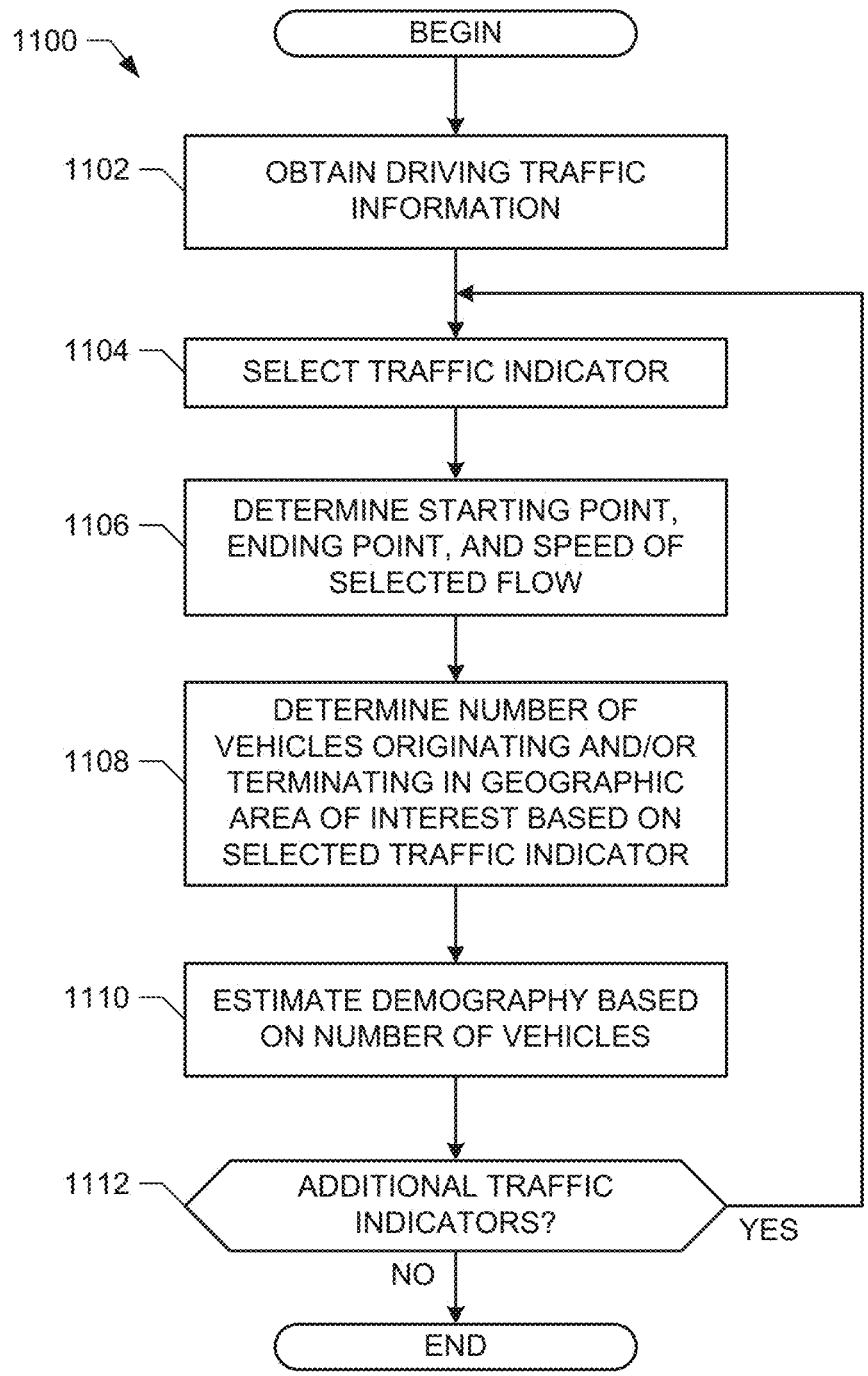
FIG. 11 is a flowchart representative of example machine readable instructions which, when executed, cause a processor to implement the example driving traffic analyzer and/or the example driving traffic collector of FIG. 1 to analyze driving information to estimate demographic characteristic(s) of a geographic area.

FIG. 11 is a flowchart representative of example machine readable instructions 1100 which, when executed, cause a processor to implement the example driving traffic analyzer 126 and/or the example driving traffic collector 128 of FIG. 1 to analyze driving information to estimate demographic characteristic(s) of a geographic area.

The example driving traffic collector 128 of FIG. 1 obtains driving traffic information (block 1102). Example sources of driving traffic information include publicly available traffic databases such as Google Maps. The example driving traffic analyzer 126 selects a traffic indicator (e.g., the traffic indicators 602, 604 of FIG. 6) (block 1104). The example driving traffic analyzer 126 determines a starting point, an ending point, and a speed of the flow of the selected traffic indicator (block 1106). For example, a traffic indicator 602, 604 may include one or more routes, one or more traffic speed indicators, and/or any other identifiers. The starting and ending points of the traffic indicator 602, 604 may include changes in traffic speed and/or changes in roadways, for example.

The example driving traffic analyzer 126 determines a number of vehicles originating and/or terminating in the geographic area of interest 110 based on the selected traffic indicator (block 1108). For example, the traffic analyzer 126 may calculate a number of vehicles that enter or exit between adjoining traffic indicators 602, 604 to estimate a number of vehicles that have originated from a region around the point where the adjoining traffic indicators 602, 604 are joined. The example driving traffic analyzer 126 and/or the demography estimator 108 estimates demography based on the number of vehicles (block 1110). For example, the driving traffic analyzer 126 may provide the vehicle information for vehicles originating and/or terminating in the geographic region of interest 110 to the example demography estimator 108, which takes the vehicle information into account when estimating demography.

The example driving traffic analyzer 126 determines whether there are additional traffic indicators to be analyzed (block 1112). If there are additional traffic indicators 602, 604 to be analyzed (block 1112), control returns to block 1104 to select another traffic indicator 602, 604. If there are no additional traffic indicators 602, 604 to be analyzed (block 1112), the example instructions 1100 of FIG. 11 end.

Figure 12:
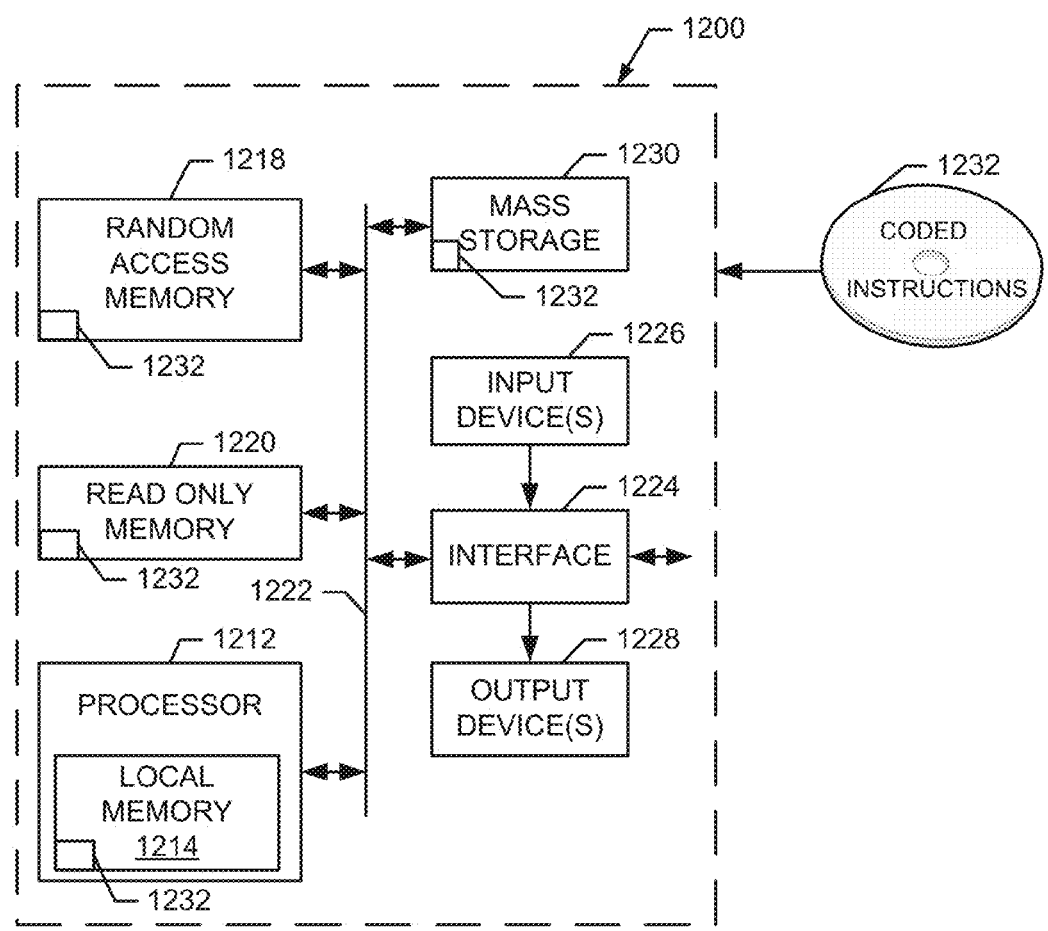
FIG. 12 is a block diagram of an example processor platform capable of executing the instructions of FIGS. 7, 8A, 8B, 9, 10, and/or 11 to implement the system of FIG. 1.

FIG. 12 is a block diagram of an example processor platform 1200 capable of executing the instructions of FIGS. 7, 8A, 8B, 9, 10, and/or 11 to implement the system 100 of FIG. 1. The processor platform 1200 can be, for example, a server, a personal computer, a mobile device (e.g., a cell phone, a smart phone, a tablet such as an iPad™, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIGS. 7, 8A, 8B, 9, 10, and/or 11 may be stored in the mass storage device 1228, in the volatile memory 1214, in the non-volatile memory 1216, and/or on a removable tangible computer readable storage medium such as a CD or DVD.

The above-disclosed example methods and apparatus reduce costs associated with determining demography of geographic areas when compared with current methods. Example methods and apparatus may be used to provide estimates of demographies in areas that cannot be sampled directly, and can estimate demography more quickly and less expensively than performing sampling or surveying. The demography estimated by example methods and apparatus disclosed herein may be used to, for example, identify emerging markets and/or a developing potential for marketing goods and services to an underserved demographic.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
analyzing, by executing an instruction using a processor, a first aerial image of a first geographic area to detect a first plurality of objects;
generating, by executing an instruction using the processor, a first signature based on the first plurality of objects;
analyzing, by executing an instruction using the processor, a second aerial image of a second geographic area to detect a second plurality of objects;
reducing an uncertainty of estimated demographics in the first geographic area by:
associating, by executing an instruction using the processor, first demographic information to the second plurality of objects, the first demographic information determined based on ground truth data associated with the second geographic area, the ground truth data obtained by a sampling of the second geographic area;
generating, by executing an instruction using the processor, a second signature based on the second plurality of objects;
comparing, by executing an instruction using the processor, the second signature to the first signature; and
estimating, by executing an instruction using the processor, second demographic information of the first geographic area based on the comparison and the first demographic information.

2. The method as defined in claim 1, further including classifying the first plurality of objects.

3. The method as defined in claim 2, wherein the first plurality of objects include at least one of a swimming pool, a first type of structure roof, a green space, a distance range to a reference location, a landmark, or a roadway width range.

4. The method as defined in claim 1, further including requesting the first demographic information from a database, the first demographic information including at least one of government census data, private census data, manual survey data, or manual sampling data.

5. The method as defined in claim 1, wherein the estimating of the second demographic information of the first geographic area includes imputing the ground truth data of the second geographic area to the first geographic area.

6. The method as defined in claim 1, further including determining a density of the first plurality of objects, the estimating of the second demographic information of the first geographic area based on the density of the first plurality of objects.

7. The method as defined in claim 1, wherein the second demographic information includes at least one of household income, population density, population age, or a family size.

8. The method as defined in claim 1, wherein the generating of the first signature based on the first plurality of objects includes cropping the first aerial image to a portion of the first aerial image corresponding to the first geographic area.

9. An apparatus, comprising:
an object detector to:
analyze a first aerial image of a first geographic area to detect a first plurality of objects in the first geographic area;
analyze a second aerial image of a second geographic area different than the first geographic area to detect a second plurality of objects in the second geographic area;
generate a first signature based on the first plurality of objects; and
generate a second signature based on the second plurality of objects;
a database to associate first demographic information to the second plurality of objects, the first demographic information determined based on ground truth data associated with the second geographic area, the ground truth data obtained by sampling of the second geographic area; and
a demography estimator to reduce an uncertainty of estimated demographics in the first geographic area by estimating second demographic information of the first geographic area based on the first demographic information and on a comparison of the second signature to the first signature.

10. The apparatus as defined in claim 9, further including an object classifier to classify the first plurality of objects based on features in the first aerial image corresponding to the first plurality of objects.

11. The apparatus as defined in claim 10, wherein the first plurality of objects include at least two of a swimming pool, a first type of structure roof, a green space, a distance range to a reference location, or a roadway width range.

12. The apparatus as defined in claim 9, wherein the demography estimator is to request the first demographic information from the database, the first demographic information including at least one of government census data, private census data, manual survey data, or manual sampling data.

13. The apparatus as defined in claim 9, further including a density calculator to determine a density of the first plurality of objects, the demography estimator to estimate the second demographic information of the first geographic area based on the density of the first plurality of objects.

14. The apparatus as defined in claim 9, wherein the second demographic information includes population income, population density, population age, or a family size.

15. The apparatus as defined in claim 9, wherein the object detector is to crop the first aerial image to a portion of the first aerial image corresponding to the first geographic area.

16. A tangible computer readable storage medium comprising computer readable instructions which, when executed, cause a processor to at least:
analyze a first aerial image of a first geographic area to detect a first plurality of objects;
analyze a second aerial image of a second geographic area to detect a second plurality of objects;
generate a first signature based on the first plurality of objects; and
reduce an uncertainty of estimated demographics in the first geographic area by:
associating first demographic information to the second plurality of objects, the first demographic information determined based on ground truth data associated with the second geographic area, the ground truth data obtained by sampling of the second geographic area;
generating a second signature based on the second plurality of objects;
comparing the second signature to the first signature; and estimating second demographic information of the first geographic area based on the comparison and the first demographic information.

17. The tangible computer readable storage medium as defined in claim 16, wherein the instructions are further to cause the processor to classify the first plurality of objects.

18. The tangible computer readable storage medium as defined in claim 17, wherein the first plurality of objects include at least one of a swimming pool, a first type of structure roof, a green space, a distance range to a reference location, a landmark, or a roadway width range.

19. The tangible computer readable storage medium as defined in claim 16, wherein the instructions are further to cause the processor to request the first demographic information from a database, the first demographic information including at least one of government census data, private census data, manual survey data, or manual sampling data.

20. The tangible computer readable storage medium as defined in claim 16, wherein the instructions are further to cause the processor to estimate the second demographic information of the first geographic area by imputing the ground truth data of the second geographic area to the first geographic area.

21. The tangible computer readable storage medium as defined in claim 16, wherein the instructions are further to cause the processor to determine a density of the first plurality of objects, the instructions to cause the processor to estimate the second demographic information of the first geographic area based on the density of the first plurality of objects.

22. The tangible computer readable storage medium as defined in claim 16, wherein the instructions are further to cause the processor to crop the first aerial image to a portion of the first aerial image corresponding to the first geographic area.

* * * * *